United States Patent Office 3,231,327
Patented Jan. 25, 1966

3,231,327
PREPARATION OF N-DICHLOROPHOSPHINYL-
IMIDOPHOSPHORIC TRICHLORIDE
Leonard Seglin, New York, N.Y., and Martin R. Lutz
and Hugo Stange, Princeton, N.J., assignors to FMC
Corporation, New York, N.Y., a corporation of
Delaware
No Drawing. Filed Nov. 13, 1961, Ser. No. 152,028
9 Claims. (Cl. 23—14)

This invention relates to the improved method for the preparation of N-dichlorophosphinylimidophosphoric trichloride.

N-dichlorophosphinylimidophosphoric trichloride is a member of a recently disclosed class of phosphorus compounds. Its structure, which is discussed in U.S. Patent No. 2,925,320 issued to E. J. Kahler on February 16, 1960, is presumed to be as follows:

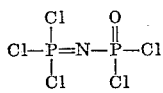

The method disclosed in the above patent involves the reaction of phosphorus pentachloride and hydroxylamine or hydroxylamine acid salts. The N-dichlorophosphinylimidophosphoric trichloride product( hereinafter termed NDT), however, must be separated from the heterogeneous reaction mixture by a series of filtration and distillation steps. The reported yield is relatively low by commercial standards.

For the manufacture of NDT on a commercial basis, a simpler and more economical method of synthesis must be employed. High product yield is necessary for large scale production. Furthermore, the presence in the final reaction mixture of large amounts of solid byproducts and reactants, which can be removed only with difficulty by filtration, should be avoided.

It is an object of this invention to furnish a method for preparing NDT, wherein the final product mixture is a clear solution containing only the product and a solvent. It is also an object of this invention to furnish a method for preparing NDT which prevents an undue quantity of solids from being present in the final product mixture. An equally important object of this invention is to produce NDT in higher yields than previously obtained.

It has now been found that NDT can be readily obtained in high overall yields by the method of treating the reaction product of phosphorus pentachloride and ammonium chloride with phosphorus pentoxide, in a liquid medium consisting either of phosphorus oxychloride, NDT alone or a mixture of phosphorus oxychloride and NDT, at a temperature of 55° to 85° C. The desired N-dichlorophosphinylimidophosphoric trichloride product, obtained in almost clear solutions of 8 to 80% by weight in phosphorus oxychloride, can be readily separated from the phosphorus oxychloride, substantially as a pure compound.

The reactions are believed to proceed as follows:

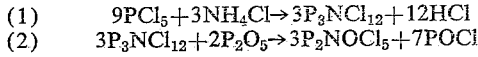

The reactants in Reaction 1 are mixed together in the presence of the liquid medium and the mixture is heated to a temperature in the range of 60° to 105° C. Since $PCl_5$ and the intermediate are only slightly soluble in the prescribed liquid media, the intermediate is, therefore, prepared as a slurry. Hydrogen chloride gas begins to evolve almost immediately upon heating, indicating that the $PCl_5$ and $NH_4Cl$ reaction has a high initial rate. This evolution may be used to determine the end point of Reaction 1.

Reaction 1 may also be conveniently operated by adding $PCl_3$ and $NH_4Cl$ to the carrying medium, and then by chlorinating the mixture. Thus $PCl_5$ may be formed in situ in the reaction mixture and under conditions approaching reaction conditions. Unlike $PCl_5$, which is a solid, liquid $PCl_3$ is miscible with the carrying medium. For this reason, less carrying medium may be used than if $PCl_5$ were initially employed. At least about 1 gram of the carrying medium per gram of $PCl_5$ should be used.

The slurry from Reaction 1 is cooled to 50° C. or less and is treated with $P_2O_5$ under continuous mixing. The consistency of the slurry to which the $P_2O_5$ is added will vary, depending upon the amount of the particular carrying medium present, although the intermediate can be completely dissolved in the carrying medium if desired. Since the thickness of the slurry, however, does not affect the carrying out of Reaction 2, large amounts of carrying medium need not be used. The temperature is raised to 55° to 85° C., and the slurry becomes thinner, until an almost clear, light yellow solution is obtained. This end point is generally reached in about an hour.

It is possible that a trace amount of excess $NH_4Cl$ will be carried over into the final solution, but the amount is so negligible that it may be easily separated from the liquids by settling, or by simple filtration, or by decanting the liquids. $POCl_3$ is readily removed by vacuum distillation; NDT may be further purified from the excess reactants by also distilling it.

The novel advantage in employing this process is that there are substantially only two components in the final solution: one is the product, NDT, and the other is $POCl_3$. The solution is composed of about 8 to 80% by weight of NDT in $POCl_3$, according to which carrying medium is initially used. Either $POCl_3$ or NDT may be used alone as the carrying medium for the initial reactants and the intermediate, and it may be supplied by diverting any stream coming from a distillation stage in which the two final components are separated. A solution of $POCl_3$ and NDT may be used more conveniently. As the product solution is formed, part of the solution may be permitted to remain in the reactor, to act as the carrying medium for a subsequent reaction sequence, while most of the reaction mass is removed.

It is believed that the presence of the particular carrying media of this process prevents the formation in Reaction 1 of polymeric phosphonitrilic halides which will not react with $P_2O_5$. The formation of $P_3NCl_{12}$, or written ionically, $[Cl_3P—N—PCl_3]^+[PCl_6]^-$, might not otherwise be obtained. The high evolution rate of HCl in Reaction 1 and the excellent recovery of $POCl_3$ in the final reaction phase indicate that very little, if any, of such a reaction occurs under Reaction 1 conditions.

Reaction 1 is conducted at between 60° and 105° C. and preferably 65° to 85° C. The reaction commences at a lower temperature, as evidenced by the evolution of hydrogen chloride gas at about 50° C. At temperatures below about 65° C., the reaction rate becomes very slow, and below 60° C., it is almost negligible. Reaction 2 is conducted at 55° C. to 85° C., and preferably at 60° to 70° C.

Between the temperatures of the preferred range, the conversion rate of the first reaction may be as high as 63.5% per hr. depending upon the carrying medium and the particular temperature within the range. The reaction is ordinarily substantially complete in 5 to 8 hours. As indicated above, the second reaction is generally complete in about one hour.

The stoichiometric amounts of $NH_4Cl$ and $PCl_5$ are adequate for completion of the reaction, although a slight excess of about 10% by weight of $NH_4Cl$ is preferred. Large excesses of $NH_4Cl$ should be avoided. In the reaction of the intermediate with $P_2O_5$, a 5% excess of $P_2O_5$ is preferred to ensure complete conversion.

The following illustrations incorporate the preferred features of this invention.

*Example I*

Into a three-necked flask equipped with stirrer, thermometer and reflux condenser, were placed 615 grams of POCl$_3$, 579 grams (2.77 moles) of PCl$_5$ and 60 grams (1.12 moles) of NH$_4$Cl. The slurry was slowly heated to 75° C. At about 50° C., HCl began to evolve, the amount being measured by absorbing it in a standard NaOH solution. The heating was continued until the theoretical amount of HCl had been absorbed. The slurry was cooled to 50° C., and 90 grams (0.63 moles) of P$_2$O$_5$ were added. The mixture was heated to 70° to 80° C. with agitation. After one hour, an almost clear colorless solution was obtained.

POCl$_3$ was distilled off at 100° C., 150 mm. Hg, the amount distilled weighing 840 grams or 89.5% of theory. The remaining crude product weighed 250 grams. This was distilled under vacuum (B.P. 85° C. at 0.2 mm.) yielding 207 grams (84.5% of theoretical) of

$$Cl_3P=NP(O)Cl_2$$

*Analysis.*—Calc'd for P$_2$NOCl$_5$: P, 23.0%. Found: P, 23.2%.

*Example II*

Into a three-necked flask equipped with stirrer, thermometer and reflux condenser, were placed 920 grams of POCl$_3$, 229 grams (1.1 moles) of PCl$_5$, and 21.7 grams (0.4 mole) of NH$_4$Cl. The slurry was heated to 65° C. and held there for 5 hours. At about 50° C., HCl began to evolve, the amount being measured by absorbing it in a standard NaOH solution. The mass was then heated to 80° C. for 3 hours until the theoretical amount of HCl had been absorbed. The slurry was cooled to 50° C. and 38 grams (0.27 mole) of P$_2$O$_5$ were added. The mixture was heated to 70° to 80° C. with agitation. After one hour, an almost clear colorless solution was obtained.

POCl$_3$ was distilled off at 100° C., 150 mm. Hg, the amount distilled weighing 997 grams of 95% of theory. The remaining crude product weighed 88 grams. This was distilled under vacuum (B.P. 85° C. at 0.2 mm.) yielding about 74 grams (78% of theoretical) of

$$Cl_3P=NP(O)Cl_2$$

*Analysis.*—Calc'd for P$_2$NOCl$_5$: P, 23.0% Found: P, 23.2%.

*Example III*

To a three-necked flask equipped as in Example I and with a gas-inlet were charged 1241 grams of POCl$_3$, 302 grams (2.2 moles of PCl$_3$ and 43 grams (0.804 mole) of NH$_4$Cl. Chlorine gas was bubbled through the slurry at room temperature until 156 grams had been picked up. The slurry was then heated to 65° C. for 4½ hours and then to 80° C. for 3¼ hours until the theoretical amount of HCl had evolved. The slurry was held at 70° C. while 72 grams (0.51 mole) of P$_2$O$_5$ were added and agitated for one hour. The reaction mixture was almost completely clear.

The solution was treated as in Example I and 1432 grams (95% of theoretical) of POCl$_3$ were recovered. The yield of undistilled NDT was 187 grams, or 95% conversion.

*Example IV*

A mixture containing 470 grams of POCl$_3$ and 150 grams of NDT was placed in a reactor with 448 grams (2.2 moles) of PCl$_5$ and 40 grams (0.75 mole) of NH$_4$Cl. This mixture was heated to 65° C. for 5 hours and then to 80° C. for 3½ hours. The mixture was cooled to 50° C., and 82 grams (0.58 mole) of P$_2$O$_5$ were added. The reaction mass was treated as described in the previous examples. A yield of 325 grams, or 94%, or undistilled NDT was obtained.

*Example V*

A mixture of 620 grams of NDT, 459 grams (2.2 moles) of PCl$_5$ and 41 grams (0.77 mole) of NH$_4$Cl was heated to 65° C. for 2½ hours and then to 80° C. for 2½ hours. At the end of the reaction, 82 grams (0.58 mole) of P$_2$O$_5$ was added and the reaction mixture was treated as in the previous examples. A total of 800 grams of distilled NDT or 87.4% final conversion was obtained.

N-Dichlorophosphinylimidophosphoric trichloride is a highly reactive building block for preparing many phosphorus products which are useful as plasticizers for flexible plastic sheeting, gasoline and lubricating oil additives, insecticides, flame-retarding agents for textiles and plastics, and corrosion-preventive agents.

The following claims are intended to cover the process as hereinbefore described, together with all obvious variations attached thereto:

What is claimed is:

1. The process for the production of N-dichlorophosphinylimidophosphoric trichloride comprising reacting the reaction product of phosphorus pentachloride and ammonium chloride, prepared in the presence of a liquid carrying medium selected from the group consisting of phosphorus oxychloride, N-dichlorophosphinylimidophosphoric trichloride, and solutions of phosphorus oxychloride and N-dichlorophosphinylimidophosphoric trichloride, with phosphorus pentoxide.

2. The process of claim 1 wherein the phosphorus pentoxide is reacted with the said reaction product of phosphorus pentachloride and ammonium chloride, at a temperature of 55° to 85° C.

3. The process of claim 1, wherein an excess above the stoichiometric requirement of 5% of P$_2$O$_5$ by weight is added to the said reaction product.

4. The process for the production of N-dichlorophosphinylimidophosphoric trichloride comprising the steps of (1) reacting phosphorus pentachloride with ammonium chloride in a liquid carrying medium selected from the group consisting of phosphorus oxychloride, N-dichlorophosphinylimidophosphoric trichloride, and solutions of phosphorus oxychloride and N-dichlorophosphinylimidophosphoric trichloride, at a temperature in the range of 60° to 105° C.;

(2) treating the reaction mixture with phosphorus pentoxide at a temperature in the range of 55° to 85° C., thereby producing a clear solution of N-dichlorophosphinylimidophosphoric trichloride and phosphorus oxychloride; and (3) removing the phosphorus oxychloride from the solution by distilling under vacuum, thereby obtaining substantially pure N-dichlorophosphinylimidophosphoric trichloride.

5. The process of claim 4, wherein the molar ratio of ammonium chloride to phosphorus pentachloride is 1.1–1.2 to 1.

6. The process of claim 4, wherein the said clear solution is used as the liquid carrying medium.

7. The process of claim 4, wherein the temperature of reaction of phosphorus pentachloride with ammonium chloride is in the range of 65° to 80° C.

8. The process of claim 4, wherein the phosphorus pentachloride is formed by adding phosphorus trichloride to the carrying medium and the ammonium chloride and by bubbling chlorine gas through the reaction mass at a temperature below 60° C.

9. The process for the production of N-dichlorophosphinylimidophosphoric trichloride comprising the steps of (1) reacting phosphorus pentachloride with ammonium chloride in a liquid medium selected from the group consisting of phosphorus oxychloride, N-dichlorophosphinylimidophosphoric trichloride, and solutions of phosphorus oxychloride and N-dichlorophosphinylimidophosphoric trichloride, wherein the reaction mass is initially heated to a temperature in the range of 60° to 75° C. for 2 to 6 hours, and then to a temperature in the range of 75° to 85° C. for 0 to 5 hours and the total time being 5 to 9 hours; and (2) treating the reaction mixture with phosphorus pentoxide, thereby producing a clear solution of N-dichlorophosphinylimidophosphoric trichloride and phosphorus oxychloride.

References Cited by the Examiner

UNITED STATES PATENTS 2,925,320  2/1960  Kahler _____ 23—14
2,975,028  3/1961  Barth-Webrenalp _____ 23—14

MAURICE A. BRINDISI, *Primary Examiner.*